April 1, 1941. I. F. DAVIDSON Re. 21,756
STEERING DEVICE FOR POWER PROPELLED VEHICLES
Original Filed Oct. 30, 1935 2 Sheets-Sheet 1
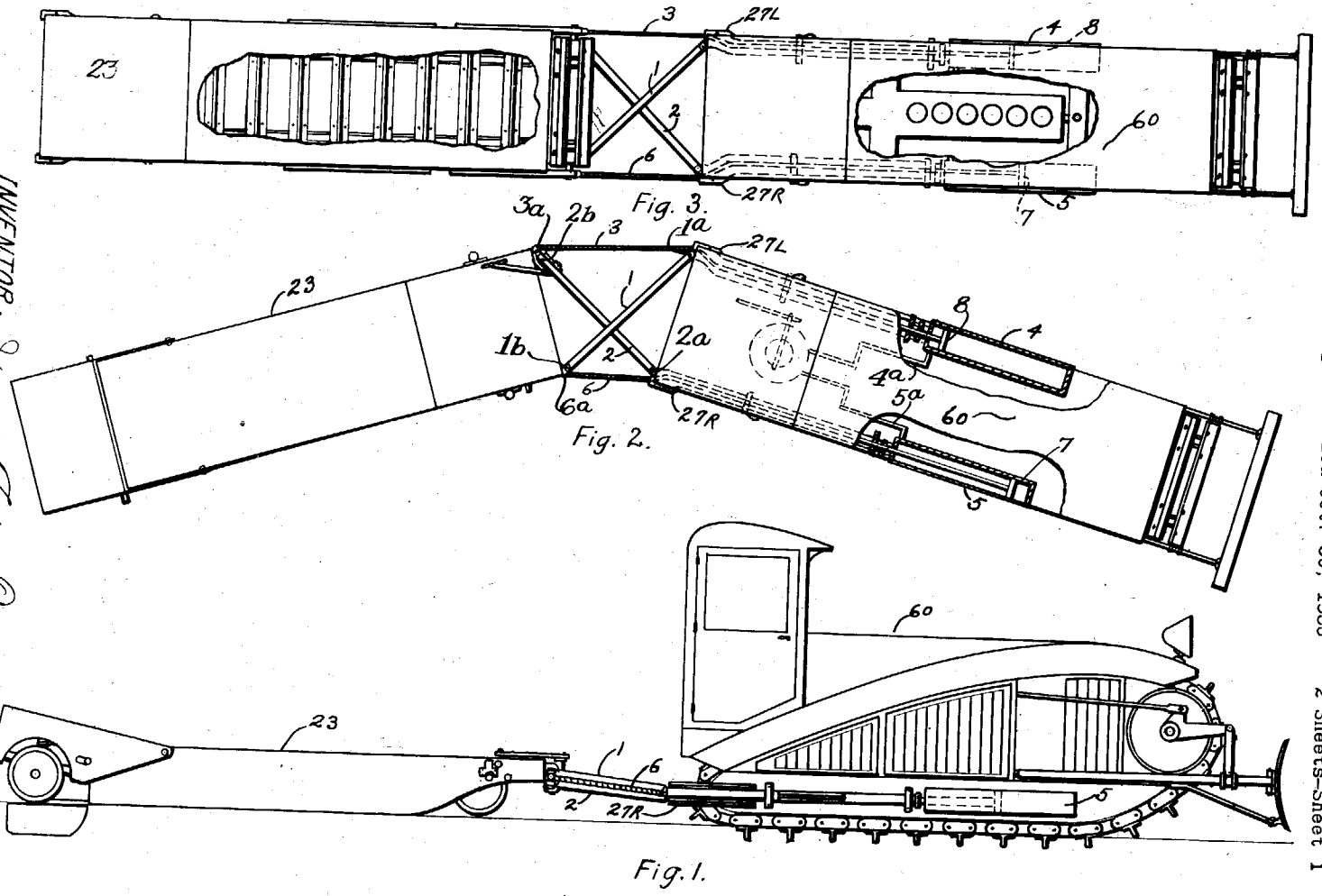
INVENTOR, Isaac Forbes Davidson April 1, 1941. I. F. DAVIDSON Re. 21,756

STEERING DEVICE FOR POWER PROPELLED VEHICLES

Original Filed Oct. 30, 1935 2 Sheets-Sheet 2

INVENTOR, Isaac Forbes Davidson

Reissued Apr. 1, 1941 Re. 21,756

UNITED STATES PATENT OFFICE 21,756

STEERING DEVICE FOR POWER PROPELLED VEHICLES

Isaac Forbes Davidson, Salem, Oreg.

Original No. 2,112,559, dated March 29, 1938, Serial No. 47,467, October 30, 1935. Application for reissue August 24, 1939, Serial No. 291,783

6 Claims. (Cl. 280—33.5)

My invention has for its purpose the providing of efficient and simple means for steering and guiding a tractor, of the tracklaying, or "caterpillar" type, over soft material and especially in deep soft snow.

An object of my invention is to adapt a "caterpillar" tractor for use in soft snow by providing increased surface traction area, which object it is possible to attain with the use of my steering means.

The ordinary two-belt "caterpillar" tractor is steered by driving the two-traction belts at unequal speed; but it cannot be so steered in deep soft snow. I have found that a "caterpillar" tractor with a traction belt approximately equal to the width of the tractor, on which the entire weight of the tractor is supported at all times is capable of traveling in deep soft snow, even up steep grades, but such a tractor cannot be steered by itself.

The specific object of my invention is to provide a means for steering a tractor in deep soft snow.

I have discovered however, that a tractor may be steered over deep soft snow by coupling thereto a sled-like steering appendage drawn by the tractor and adapted to exert a pull or drag on that side of the tractor towards which it is to be steered. Accordingly I attain the object of my invention by the combination of a tractor and a sled-like, trailing, steering appendage coupled to the tractor by a hitch adjustable (preferably from the tractor) so as to pull the tractor and said steering appendage together at an angle on either side; the tractor being provided with a traction-belt element adapted to be driven forward as a unit, and to make a rut of substantial depth in soft deep snow of such width as to constitute a rut in which the steering appendage will follow, with the sides of the steering appendage in close relation to the sides of said rut, thus restraining the turning of the steering appendage towards either side, the weight of the steering appendage being adapted to hold it in said rut, whereby, with the manipulation of said hitch so as to force the steering appendage and the tractor into angular position with each other, the resistance of the side walls of the rut to the turning of the steering appendage will impose a drag on one side of the tractor and cause it to turn towards such side.

The details, arrangements and devices which I have found convenient to employ in carrying out my invention are hereinafter described with reference to the accompanying drawings.

In the drawings:

Figure 1 shows a side elevation of a tractor and a trailer sled coupled together by a hitch, to force the sled into angular relation with the tractor and thereby steer the tractor;

Figure 2 shows a plan view of the tractor and sled coupled together as shown by Figure 1, with the steering hitch manipulated so as to cause the tractor to make a right-hand turn.

Figure 3 shows a plan view of two tractors coupled together in tandem fashion by a steering hitch;

Figure 4:
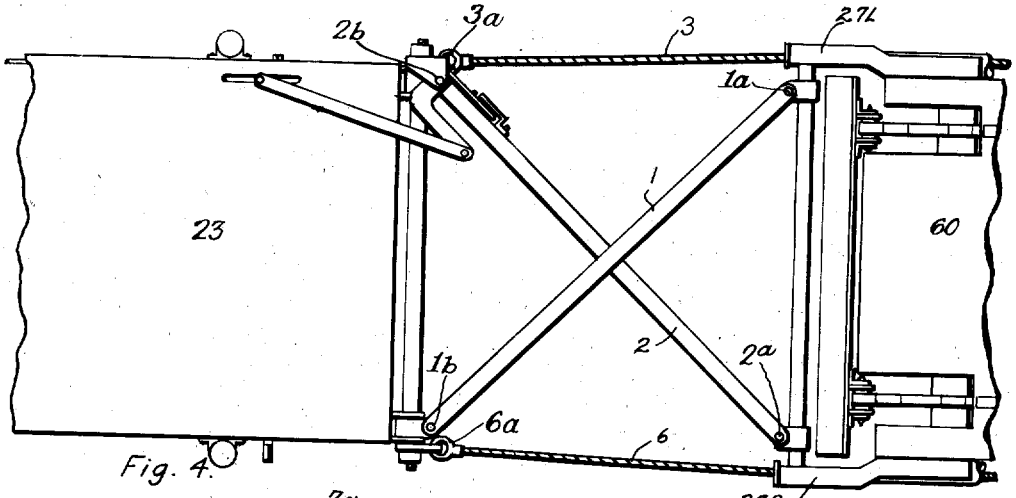
Figure 4 is an enlarged plan view of the hitch showing details of the various mechanisms necessary to perform all steering operations.
Figure 5:
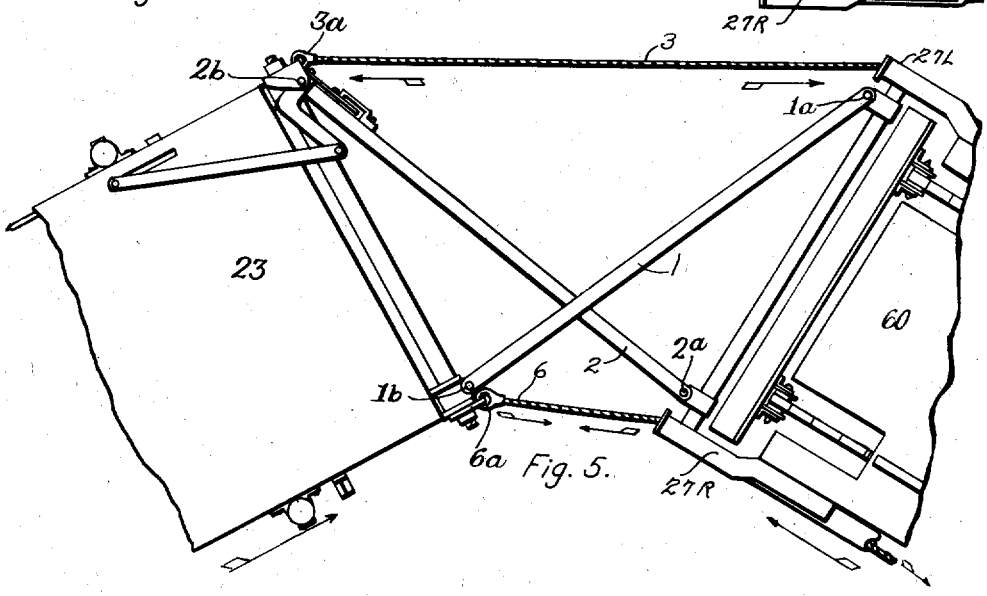
Figure 5 is a plan view similar to Figure 4 but showing the position of the hitch during a steering operation.

The bars 1 and 2 are of equal length and are attached to the tractor 60 and sled 23 by universal joints 1*a*, 1*b* and 2*a*, 2*b*, respectively which allow a movement of the bars in any direction required in turning or passing over uneven road surfaces.

One end of a cable 3 is fastened securely to the forward end at the left side of sled 23 at the point 3*a* and the other end of cable 3 is connected to a piston rod in a hydraulic cylinder 4 on left side of tractor 60. The cable 3 passes through guide tube 27L on rear left side of tractor 60.

A similar cable 6 connected to the sled at the point 6*a*, extending thru guide tube 27R and connected to a piston rod in hydraulic cylinder 5 is similarly mounted on right side of tractor 60 and sled 23. In traveling over snow the tractor sinks deep enough to make a rut or channel for the sled to follow in. The sled being drawn along in the rut functions as a rudder to steer the tractor, as the sled cannot move sideways to any great extent, without a side of the sled coming in contact with a side of the rut made by the tractor. The tractor 60 has a single broad traction-belt of approximately the same width as the tractor, and the trailer vehicle 23 is of the same width as the tractor and fits in the rut made by the tractor.

In Fig. 2, the piston 7, which is connected to the forward end of the cable 6, has been forced forward by hydraulic pressure created in the cylinder 5 in which the piston 7 is located, such hydraulic pressure being created by fluid forced into the cylinder 5 thru the pipe 5*a*; and simultaneously, the piston 8 of the cylinder 4, to which piston the forward end of cable 3 is connected, has been allowed to be pulled backward by permitting the fluid in the cylinder 4 to pass out thru the pipe 4a. The result of the pulling forward or tightening of cable 6 and the slackening of cable 3, is to bring the right front end of the sled 23 and the right rear end of the tractor 60 closer together. As this takes place, pressure is exerted on bar 1 in a forward direction, and, as this bar is connected at its forward end to the left side of the tractor 60, a pressure is exerted forward and outward on the left rear of the tractor 60.

Bar 2 is at the same time exerting a pressure outward and backward on the left side of the sled. As the forces exerted on the rear end of the tractor are forward on the left side and backward on the right side it will force the tractor to turn or pivot in about its bottom center and its direction of travel is then changed as desired by a pull on cable 6.

The turns to the left are made in a similar manner by forcing the piston 8 forward and permitting piston 7 to move backward. The flow and exhaust of the fluid into and from the cylinders 5 and 4 is controlled manually by any of the well-known valves and accessories incidental to hydraulic systems (but the means of control is not shown in the drawings).

The closer the sides of the tractor and sled are moved together the shorter will be the turn in the direction the turn is being made.

This steering device can also be used to guide two tractors that are coupled tandem fashion and both tractors pull continuously in making all turns.

I claim:

1. The combination of, a "caterpillar" tractor and a sled-like trailing steering appendage drawn by said tractor, said steering appendage coupled to said tractor by an adjustable hitch, so as to pull said tractor and steering appendage together at an angle on either side, said tractor having a traction-belt element adapted to make a rut of the width of the steering appendage and of substantial depth when traveling in deep soft snow in which rut said steering appendage will follow, the weight of said steering appendage adapted to hold it in said rut, whereby, when said hitch is manipulated so as to force said tractor and said steering appendage into angular position with each other, the resistance of the side wall of the rut to the turning of the steering appendage will impose a drag on one side of the tractor and cause it to turn towards that side.

2. The combination of, a "caterpillar" tractor and a sled-like trailing steering appendage drawn by said tractor, said steering appendage coupled to said tractor by a hitch adjustable from said tractor, so as to pull said tractor and steering appendage together at an angle on either side, said tractor having a traction-belt element adapted to make a rut of the width of the steering appendage and of substantial depth when traveling in deep soft snow in which rut said steering appendage will follow, said steering appendage being of substantially the same width as said traction belt, the weight of said steering appendage adapted to hold it in said rut, whereby, when said hitch is manipulated so as to force said tractor and said steering appendage into angular position with each other, the resistance of the side wall of the rut to the turning of the steering appendage will impose a drag on one side of the tractor and cause it to turn towards that side.

3. The combination of, a "caterpillar" tractor and a trailing steering sled drawn by said tractor, said steering sled coupled to said tractor by an adjustable hitch, so as to pull said tractor and steering sled together at an angle on either side, said tractor having a traction-belt element adapted to make a rut of the width of the steering appendage and of substantial depth when traveling in deep soft snow in which rut said steering sled will follow, said steering sled being of substantially the same width as said traction belt, the weight of said steering sled adapted to hold it in said rut, whereby, when said hitch is manipulated so as to force said tractor and said steering sled into angular position with each other, the resistance of the side wall of the rut to the turning of the steering sled will impose a drag on one side of the tractor and cause it to turn towards that side.

4. In combination with a pair of vehicles in tandem arrangement, a hitch for connecting the rear end of the forward vehicle to the forward end of the rear vehicle, said hitch including a pair of cross rods of equal length, each of said rods joining the forward end of the rear vehicle at one side to the rear end of the forward vehicle at the opposite side, flexible connecting means connecting said forward and rear vehicles on each side, and means associated with said flexible connecting means for decreasing the distance between the forward end of the rear vehicle and the rear end of the forward vehicle on one side while permitting said distance to be increased on the other side.

5. The combination described by claim 4 with the connections between said rods and said vehicles constituting universal joints.

6. The combination of a track laying tractor, a vehicle behind said tractor and in tandem relation with it, and a hitch between said vehicle and said tractor, said hitch including a pair of cross rods of approximately equal length connecting the forward ends of said vehicle and the rear ends of said tractor at opposite sides, flexible means connecting said tractor and said vehicle on each side, and means associated with said flexible connecting means whereby the distance between said tractor and said vehicle may be made shorter on one side than on the other and thus cause said tractor and said vehicle to turn with respect to each other.

ISAAC FORBES DAVIDSON.